United States Patent
Horner

(10) Patent No.: US 12,366,464 B2
(45) Date of Patent: Jul. 22, 2025

(54) AIRCRAFT FLIGHT CONTROL SURFACE POSITION SENSING SYSTEM

(71) Applicant: HONEYWELL INTERNATIONAL INC., Charlotte, NC (US)

(72) Inventor: Darrell W. Horner, Tempe, AZ (US)

(73) Assignee: HONEYWELL INTERNATIONAL, INC., Charlotte, NC (US)

(*) Notice: Subject to any disclaimer, the term of this patent is extended or adjusted under 35 U.S.C. 154(b) by 282 days.

(21) Appl. No.: 18/295,335

(22) Filed: Apr. 4, 2023

(65) Prior Publication Data

US 2024/0263968 A1 Aug. 8, 2024

Related U.S. Application Data

(60) Provisional application No. 63/483,394, filed on Feb. 6, 2023.

(51) Int. Cl.
*B64C 13/00* (2006.01)
*B64C 13/50* (2006.01)
*G01D 5/14* (2006.01)

(52) U.S. Cl.
CPC ............ *G01D 5/142* (2013.01); *B64C 13/50* (2013.01); *G01D 2205/20* (2021.05)

(58) Field of Classification Search
CPC .... G01D 5/142; G01D 2205/20; B64C 13/50; B64C 13/503; B64D 45/0005
See application file for complete search history.

(56) References Cited

U.S. PATENT DOCUMENTS

| | | | |
|---|---|---|---|
| 6,690,159 B2 | 2/2004 | Burreson et al. | |
| 7,840,316 B2 | 11/2010 | Yount et al. | |
| 8,583,293 B2 | 11/2013 | Soronda | |
| 10,940,927 B2 | 3/2021 | Chan et al. | |
| 11,097,834 B2 | 8/2021 | Wilkens | |
| 2005/0253928 A1* | 11/2005 | McKeown | G01C 11/02 348/E5.09 |
| 2007/0007385 A1 | 1/2007 | Potter et al. | |
| 2010/0039104 A1 | 2/2010 | Petersen et al. | |
| 2020/0186005 A1 | 6/2020 | Borgarelli et al. | |
| 2022/0227483 A1 | 7/2022 | Scanlan et al. | |

FOREIGN PATENT DOCUMENTS

CN 107919830 B 11/2020
EP 3936429 A1 1/2022

* cited by examiner

*Primary Examiner* — Ian Jen
(74) *Attorney, Agent, or Firm* — Lorenz & Kopf LLP

(57) ABSTRACT

A digital surface position sensor includes a position sensor, an adaptable hardware interface, and a processing circuit. The position sensor is adapted to be coupled to an aircraft flight control surface and is configured to sense a position of the aircraft flight control surface and supply a position signal representative thereof. The adaptable hardware input supplies an identification signal that identifies the aircraft flight control surface to which the position sensor is coupled. The processing circuit is coupled to receive the position signal and the identification signal. The processing circuit is configured, upon receipt of the signals, to process the position signal and the identification signal and generate (i) a first digital position signal representative of the position of, and the identification of, the aircraft flight control surface and (ii) and independent second digital signal representative of the position of, and the identification of, the aircraft flight control surface.

20 Claims, 5 Drawing Sheets

AIRCRAFT FLIGHT CONTROL SURFACE POSITION SENSING SYSTEM

TECHNICAL FIELD

The present disclosure relates to position sensors and position sensing systems, and more particularly relates to aircraft flight control surface position sensing systems.

BACKGROUND

Modern aircraft are evolving to a more-electric architecture for actuation requirements, including for flight control surface control, engine tilt control, and propeller pitch control—as well as a number of other utility applications. More electric control relies on the use of electro-mechanical actuators (EMAs) with electro-mechanical motors. Electro-mechanical actuators in turn rely on electro-mechanical actuator controllers (EMACs). Some aircraft actuation requirements are categorized as flight critical and thus require high integrity EMA control to prevent loss of control or erroneous control. Because of the flight criticality, EMACs, which contain electronic circuitry and software, must also be of high integrity.

Most EMAs contain output position sensors that the EMACs utilize as feedback for their control. However, in some cases, additional sensors are mounted on the aircraft flight control surfaces to provide additional position feedback that is redundant to the EMA position sensors. These surface position sensors (SPS) are utilized by the flight control system to determine if there is a disconnect between the EMA and the controlled surface. These sensors can also be used by the flight control system as a redundant, dissimilar feedback to ensure that the EMA/EMAC sub-system is controlling according to the flight control system's position command. As such, SPS are often required to bypass the EMA/EMAC and be read directly by the flight control system computers or other system on the aircraft.

Traditional SPSs are typically in the form of potentiometers, resolvers, and rotary variable differential transformers (RVDTs). While generally robust and reliable, these sensors can exhibit certain drawbacks. For example, potentiometers are subject to wear, and the associated analog-to-digital circuitry is affected by temperature. Resolvers typically rely on complex interfacing circuitry, and are relatively heavy, and moderately expensive. RVDTs typically rely on complex interfacing circuitry, are relatively heavy, and are expensive.

In all cases, for each instance of a potentiometer, resolver, or RVDT, a dedicated circuit must provide excitation and receive and convert feedback, ultimately to a digital equivalent signal. This means, that if there are 10-20 SPSs, there must be 10-20 dedicated circuits that receive and process these signals. This requires large and expensive circuitry for each airplane. And there are many wires and the associated wire/electrical connector weight is a problem that can affect airplane performance.

Additionally, if an SPS is installed, or removed and replaced, a mechanical calibration is required to make the device functional with the receiving circuitry. This can require several attempts prior to the output of the SPS achieving the tolerances required for the performance requirement.

Hence, there is a need for a sensor that does not exhibit the drawbacks described above. The instant disclosure addresses this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an aircraft flight control surface position sensing system, includes a flight control computer and a digital surface position sensor in operable communication with the flight control computer. The digital surface position sensor includes a position sensor, an adaptable hardware interface, and a processing circuit. The position sensor is adapted to be coupled to an aircraft flight control surface and is configured to sense a position of the aircraft flight control surface and supply a position signal representative thereof. The adaptable hardware input supplies an identification signal that identifies the aircraft flight control surface to which the position sensor is coupled. The processing circuit is coupled to receive the position signal and the identification signal. The processing circuit is configured, upon receipt of the signals, to process the position signal and the identification signal and generate (i) a first digital position signal representative of the position of, and the identification of, the aircraft flight control surface and (ii) and independent second digital signal representative of the position of, and the identification of, the aircraft flight control surface.

In another embodiment, a digital surface position sensor includes a position sensor, an adaptable hardware interface, and a processing circuit. The position sensor is adapted to be coupled to an aircraft flight control surface and is configured to sense a position of the aircraft flight control surface and supply a position signal representative thereof. The adaptable hardware input supplies an identification signal that identifies the aircraft flight control surface to which the position sensor is coupled. The processing circuit is coupled to receive the position signal and the identification signal. The processing circuit is configured, upon receipt of the signals, to process the position signal and the identification signal and generate (i) a first digital position signal representative of the position of, and the identification of, the aircraft flight control surface and (ii) and independent second digital signal representative of the position of, and the identification of, the aircraft flight control surface.

In yet another embodiment, an aircraft fly-by-wire flight control system includes a flight control surface actuator controller, a flight control surface actuator, a flight control inceptor, a flight control computer, and a digital surface position sensor. The flight control surface actuator controller is coupled to receive flight control surface position command data that is indicative of a commanded position of a flight control surface. The flight control surface actuator controller is configured, upon receipt of the flight control surface position command data, to generate and supply flight control surface actuator commands. The flight control surface actuator is coupled to receive the flight control surface actuator commands from the flight control surface actuator controller and is configured, upon receipt thereof, to move the flight control surface to the commanded position. The flight control inceptor is configured to receive user input from a user and is configured, in response to the user input, to supply inceptor command data. The flight control computer is in operable communication with the flight control inceptor and the flight control surface actuator controller. The flight control computer is coupled to receive the inceptor command data from the flight control inceptor and is configured, upon receipt of the inceptor data, to generate and supply the flight control surface position command data to the flight control surface actuator controller. The digital surface position sensor is in operable communication with at least the flight control computer and includes a position sensor, an adaptable hardware interface, and a processing circuit. The position sensor is adapted to be coupled to an aircraft flight control surface and is configured to sense a position of the aircraft flight control surface and supply a position signal representative thereof. The adaptable hardware input supplies an identification signal that identifies the aircraft flight control surface to which the position sensor is coupled. The processing circuit is coupled to receive the position signal and the identification signal. The processing circuit is configured, upon receipt of the signals, to process the position signal and the identification signal and generate (i) a first digital position signal representative of the position of, and the identification of, the aircraft flight control surface and (ii) and independent second digital signal representative of the position of, and the identification of, the aircraft flight control surface.

Furthermore, other desirable features and characteristics of the digital surface position sensor will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
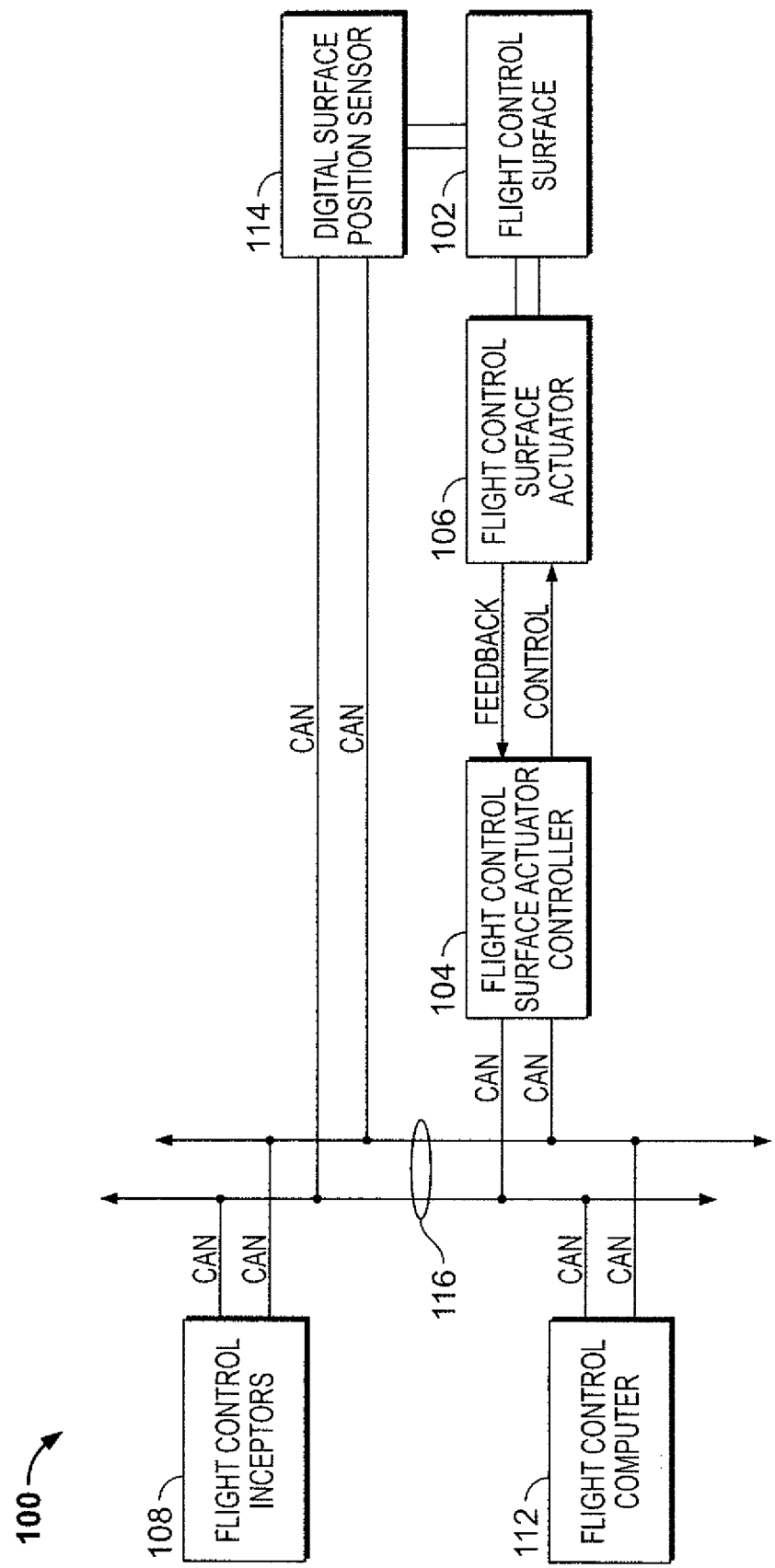
FIG. 1 a functional block diagram of one embodiment of an aircraft fly-by-wire flight control system.

Referring to FIG. 1, a functional block diagram of one embodiment of an aircraft fly-by-wire flight control system 100 is depicted. For simplicity, ease of illustration, and ease of description, the depicted system 100 is configured to control the position of a single flight control surface 102. It will be appreciated, however, that in other embodiments, such as the one described further below, the system 100 may be configured to control multiple flight control surfaces.

The depicted system 100 includes at least one flight control surface actuator controller 104, at least one flight control surface actuator 106, one or more flight control inceptors 108, at least one flight control computer 112, and at least one digital surface position sensor 114. The flight control surface actuator controller 104 is coupled to receive flight control surface position command data that is indicative of a commanded position of the flight control surface 102. The flight control surface actuator controller 104 is configured, upon receipt of the flight control surface position command data, to generate and supply flight control surface actuator commands to the flight control surface actuator 106.

The flight control surface actuator(s) 106 is coupled to receive the flight control surface actuator commands from the flight control surface actuator controller 104 and is configured, upon receipt thereof, to move the flight control surface 102 to the commanded position. It will be appreciated that the flight control surface actuator(s) 106 may be implemented using any one of numerous known actuators, but in the depicted embodiment it is implemented using an electromechanical actuator, such as, for example, a motor-driven ball screw actuator. As FIG. 1 also depicts, the flight control surface actuator(s) 106 supplies feedback (e.g., position feedback) to the flight control surface actuator controller 104.

The flight control inceptor(s) 108 is in operable communication with the flight control surface actuator controller(s) and the flight control computer(s) 112. The flight control inceptor(s) 108 is configured to receive user input from a user (e.g., a pilot) and is configured, in response to the user input, to supply the inceptor command data to the flight control computer(s) 112. The flight control inceptor(s) 108 may be implemented as a yoke, a side stick, a collective, and/or a rudder pedal, just to name a few non-limiting examples.

The flight control computer(s) 112 is in operable communication with the flight control inceptor(s) 108 and the flight control surface actuator controller(s) 104. The flight control computer(s) 112 is coupled to receive the inceptor command data from the flight control inceptor(s) 112 and is configured, upon receipt of the inceptor data, to generate and supply the flight control surface position command data to the flight control surface actuator controller 104.

The digital surface position sensor(s) 114 is in operable communication with at least the flight control computer(s) 112. The digital surface position sensor(s) 114 is coupled to, and is configured to sense the position of, the aircraft flight control surface 102 and supply a position signal representative thereof to the flight control computer(s) 112. The digital surface position sensor(s) is also configured to implement additional functions, which will be described momentarily. Before doing so, however, it is noted that the flight control surface actuator controller(s) 104, the flight control inceptor(s) 108, the flight control computer(s) 112, and the digital surface position sensor(s) 114 are all in operable communication via a suitable communication bus architecture 116. Although various buses and associated protocols could be used, in the depicted embodiment a Controller Area Network protocol (CAN bus) architecture is used. In other embodiments, the RS485 communication bus may be used. Although other bus architectures/technologies may be utilized, the CAN bus architecture and RS485 bus architecture are preferred because these utilize only two wires per bus, and because many flight control system computers and avionics computers already have built-in CAN and RS485 bus interfaces.

Returning to the description, and with reference now to FIG. 2, one embodiment of the digital surface position sensor 114 will now be described. The digital surface position sensor 114 includes at least a position sensor 202, an adaptable hardware input 204, and a processing circuit 206. The position sensor 202 is adapted to be coupled to the aircraft flight control surface 102. To do so, the depicted digital surface position sensor 114 includes a mechanical interface shaft 208 that is used to couple the aircraft flight control surface 102 to the position sensor 202. The position sensor 202 is configured to sense the position of the aircraft flight control surface 102 and supply a position signal representative thereof. Although the position sensor 202 may be implemented using any one of numerous known types of sensors, in the depicted embodiment it is implemented using a Hall sensor 212 and a magnet 214. The magnet 214 is coupled to, and rotates with, the mechanical interface shaft 208, and the Hall sensor 212, as is known, supplies the position signal in response to the magnet 214 rotations by converting the magnetic flux to the position signal, which may be an analog sin/cos waveform or digital signal.

The adaptable hardware input 204 provides an identification signal that identifies the aircraft flight control surface 102 to which the position sensor 202 is coupled. In the depicted embodiment, the adaptable hardware input 204 includes pins and jumper wires that can be read by the processing circuit 206 to self-detect which aircraft flight control surface 102 the position sensor 202 is coupled. As used herein, this is called the "location identification" or LOC ID. The LOC ID may be represented in a specific valid open/ground pattern that can result in multiple valid LOC IDs. For example, these pins can be read in a binary code, and included in this could be an odd or even parity signal to ensure that the input is not compromised.

The processing circuit 206 may include one or more processors and computer-readable storage devices or media encoded with programming instructions for configuring the processing circuit 206. The one or more processors may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the one or more processors.

The processing circuit 206 is coupled to receive the position signal and the identification signal and is configured, upon receipt of these signals, to process the position signal and the identification signal and generate a first digital signal and an independent second digital signal. The first digital position signal and the independent second digital signal are each representative of the position of, and the identification of, the aircraft flight control surface 102. The signals generated in the digital surface position sensor 114 may be transmitted as low-power digital signals, such as a Serial Peripheral Interface (SPI) or parallel bus or other bus on the market. In the depicted embodiment, as was already alluded do, the signals are transmitted as low-power digital signals having a digital bus protocol, such as the CAN bus protocol.

Preferably, the first digital position signal and the independent second digital signal are conditioned and protected by circuitry to transmit the signals out of the digital surface position sensor 114. To this end, and as FIG. 2 also depicts, the digital surface position sensor 114 additionally includes a first digital protocol bus driver 216, a second digital protocol bus driver 218, first signal conditioning circuitry 222, and second signal conditioning circuitry 224. The first digital protocol bus driver 216 is coupled to receive and convert the first digital position signal to a converted first digital position signal having a digital bus protocol, and the second digital protocol bus driver 218 is coupled to receive and convert the second digital position signal to a converted second digital position signal having the digital bus protocol. The first signal conditioning circuitry 222 is coupled to receive and transmit the converted first digital position signal supplied from the first digital protocol bus driver 216, and the second signal conditioning circuitry 224 is coupled to receive and transmit the converted second digital position signal supplied from the second digital protocol bus driver 218. It is noted that, at least in the depicted embodiment, the first and second digital protocol bus drivers 216, 218 are each Controller Area Network (CAN) bus drivers and the digital bus protocol is the CAN bus protocol.

When the digital surface position sensor 114 is installed, it is mechanically grounded (via a mounting flange) to a fixed surface, and the mechanical interface shaft 208 is coupled to the flight control surface 102. No mechanical calibration is required to find the "zero" point of the position sensor 202 (unlike with potentiometers, resolvers, and RVDTs). Instead, after installation, when the flight control surface 102 is set in its "null" position (e.g., aerodynamically neutral position), either the flight control computer 112 or the digital surface position sensor 114 can be configured to implement what is referred to herein as a pairing process. When the flight control computer 112 is configured to implement the pairing process, it does so in response to an input command. More specifically, upon receipt of the input command, the flight control computer 112 receives the first and second digital position signals from the digital surface position sensor when the aircraft flight control surface is in its stowed position. The flight control computer 112 then processes the first and second digital position signals to determine an offset position of the digital surface position sensor 114 relative to the stowed position, and then stores the offset position in non-volatile memory for use in computing actual aircraft flight control surface position. The flight control computer 112 is further configured to compute the actual aircraft flight control surface position by computing the difference between the offset position and the sensed position of the aircraft flight control surface 102.

When the digital surface position sensor 114 is configured to implement the pairing process, it also does so in response to an input command. More specifically, upon receipt of the input command, the processing circuit 206 processes the first and second digital position signals to determine an offset position of the digital surface position sensor 114 relative to the aerodynamically neutral position, and then stores the offset position in non-volatile memory for use in computing actual aircraft flight control surface position. The processing circuit 206 is further configured to compute the actual aircraft flight control surface position by computing the difference between the offset position and the sensed position of the aircraft flight control surface.

For completeness, an example of the pairing process, when implemented in the flight control computer 112, will now be described. For this description, it is assumed that the flight control surface 102 is a wing surface that is positioned in its 0-degrees position (e.g., null or aerodynamically neutral position), and that the associated digital surface position sensor 114 was randomly installed to read 22-degrees when the wing surface is in its 0-degree position. Upon receiving the input command, the flight control computer 112 reads +22-degrees from the digital surface position sensor 114, and thus stores this value as the offset in its non-volatile memory. Thereafter, for each position value supplied from the digital surface position sensor 114, the flight control computer 112 subtracts 22-degrees from the value. For example, if the wing surface is actually at 33-degrees, the digital surface position sensor 114 will transmit 55-degrees (33+22). When the flight control computer receives the 55-degrees value, it subtracts 22-degrees from this value, resulting in a 33-degree position for the wing surface.

Figure 2:
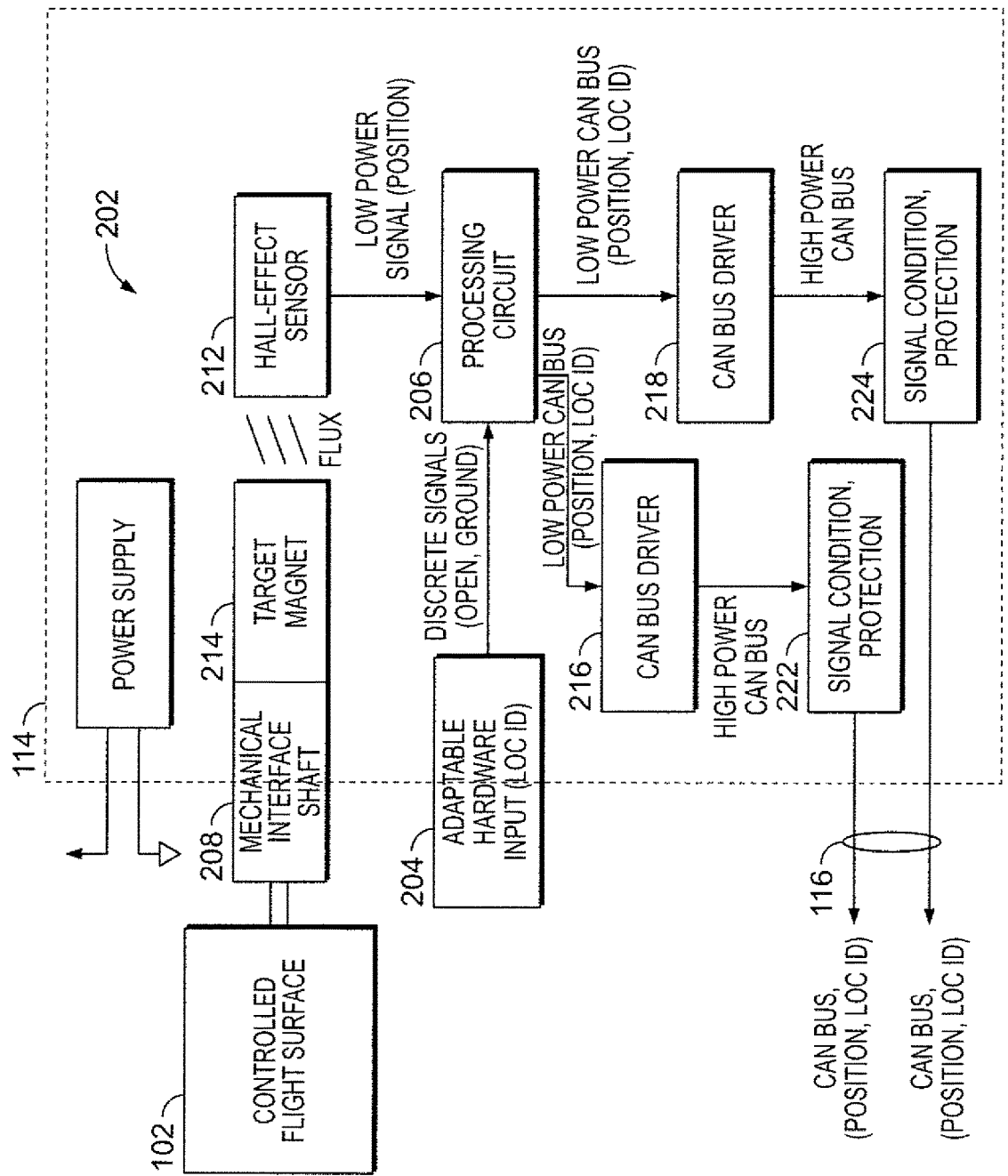
FIG. 2 depicts a functional block diagram of one embodiment of a digital surface position sensor that may be implemented in the system of FIG. 1.
Figure 3:
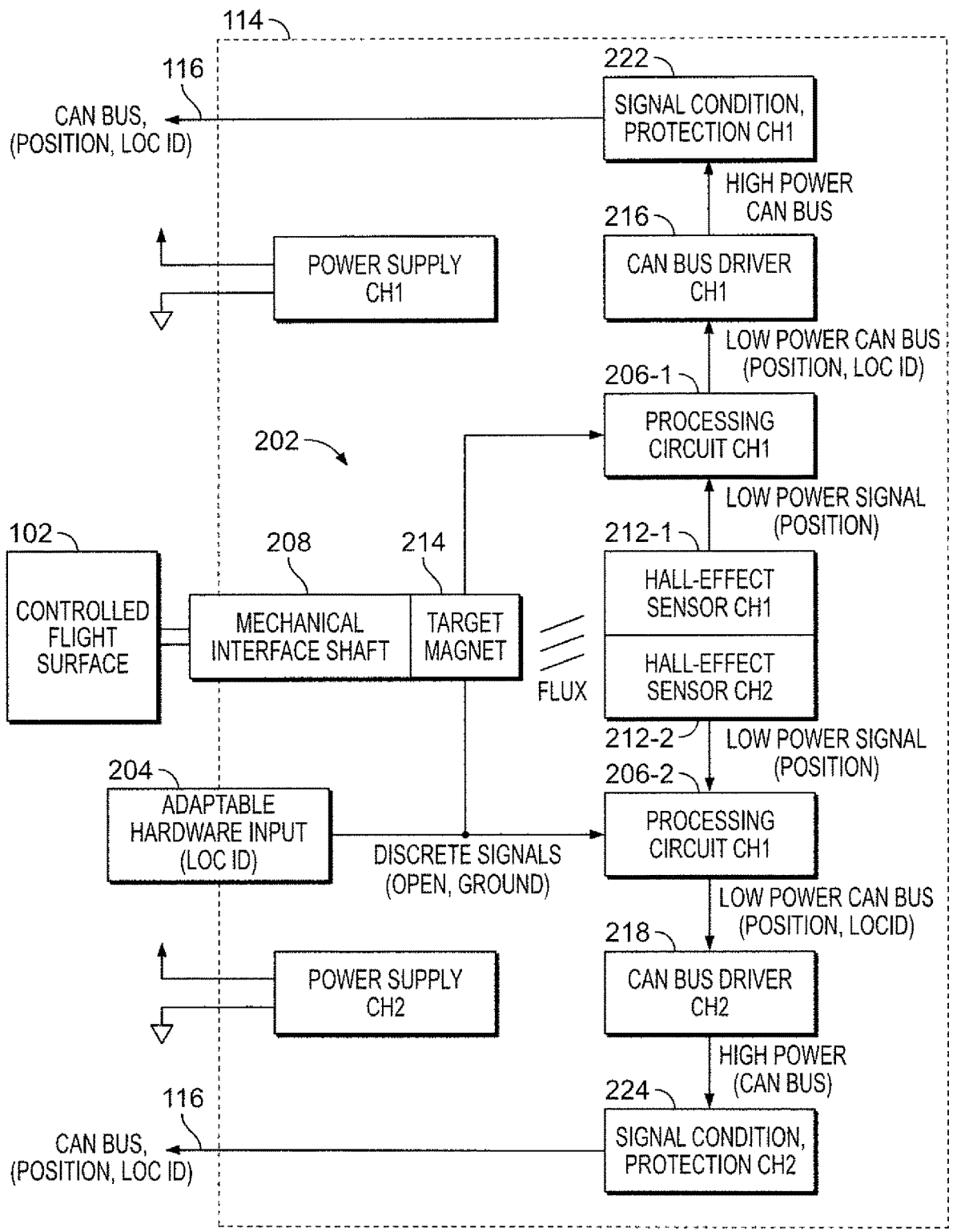
FIG. 3 depicts a functional block diagram of another embodiment of a digital surface position sensor that may be implemented in the system of FIG. 1.

The digital surface position sensor 114 depicted in FIG. 2 includes only one Hall sensor 212. It will be appreciated, however, that in some embodiments the digital surface position sensor 114 may include two Hall sensors 212 (212-1, 212-2). In such embodiments, one of which is depicted in FIG. 3, each sensor 212 and its associated circuitry (e.g., processing circuit 206-1, 206-2, digital protocol bus driver 216, 218, signal conditioning circuitry 222, 224) is preferably powered from its own separate power input.

Figure 4:
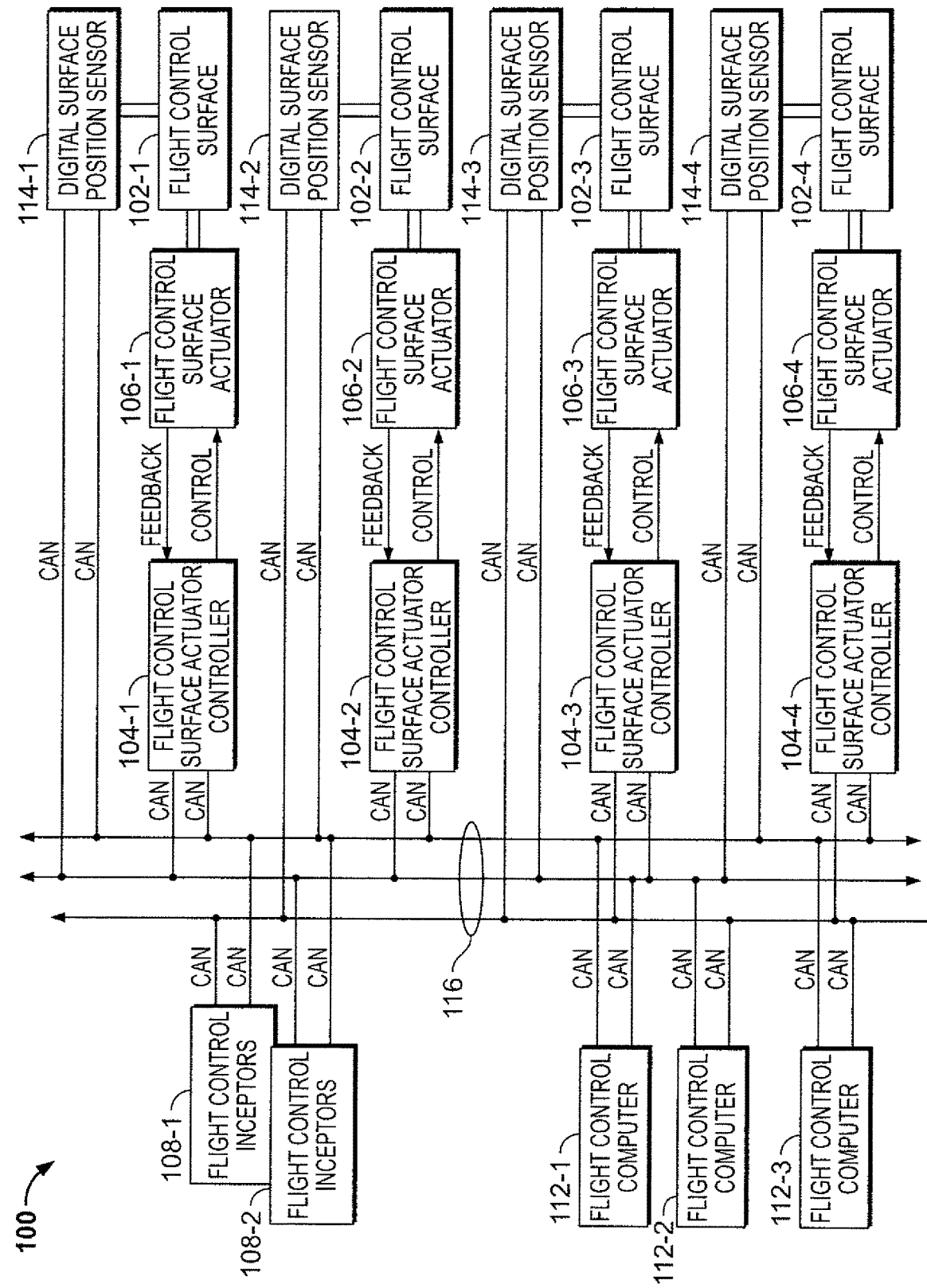
FIG. 4 a functional block diagram of another embodiment of an aircraft fly-by-wire flight control system.

Additionally, because the digital surface position sensor 114 is implemented using a dual-network bus protocol, redundant flight control surface positions are transmitted. This enables receipt of information in a parallel manner; for example, via different flight control surface actuator controllers 104 or flight control computers 112 that are redundant to each other (as alluded to above). Such a configuration is depicted in FIG. 4. This configuration allows different methods to check and balance the digital surface position sensor 114 output for integrity.

Figure 5:
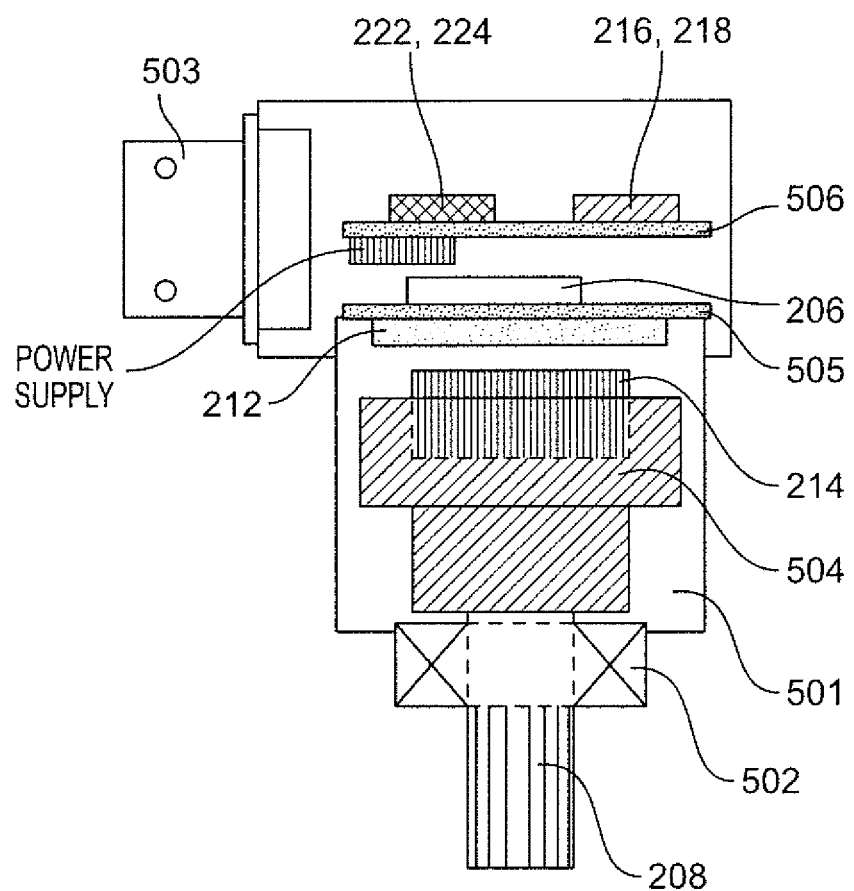
FIG. 5 depicts one embodiment of a physical implementation of the digital surface position sensor of FIG. 2 or 3.

Referring now to FIG. 5, one embodiment of a physical implementation of the digital surface position sensor 114 is depicted. There is a mechanical interface feature on the housing 501 to mount the digital surface position sensor 114 to a fixed member of the aircraft to the rotational control surface coupling. This can be a bolt pattern, or a v-band coupling, and can include a close tolerance centering feature—like a mating male-to-female diameter. The housing 501 contains one or more electrical connectors 503 that couple to the aircraft wiring harness.

The depicted interface shaft 208 includes features to engage into the control surface coupling. This can be a serrated spline. There is a bearing 502 to allow the interface shaft 208 to rotate relative to the digital surface position sensor 114 housing. This can be a bushing or roller bearing depending on the expected side loading, bearing support can also prevent radial movement of the shaft There is a magnet holder 504 on the interface shaft 208 to electrically isolate the magnet 214 from the interface shaft 208 and housing 501. This feature prevents lightning strike voltages to couple to the magnet itself.

The Hall sensor 212 is mounted directly above, or to the side, of the magnet 214 to read the magnetic flux. The Hall sensor 212 is mounted using locating features on it or a sensor printed board assembly (PBA) 505 to ensure that it mounts within the correct x, y, z interface to ensure sensor accuracy. The Hall sensor 212 and all associated circuitry are mounted with adequate electrical isolation from the interface shaft 208 or housing to prevent damage from lightning strike voltages. This is usually accomplished by mounting the electrical circuits 216, 218, 222, 224 on one or more circuitry PBAs 506 that are screwed to the housing 501. The PBA area that is near the interface shaft 208 or housing 501 is bare PBA material with no copper or electrical conductors nearby.

The input power supply and output CAN bus preferably have aerospace quality conditioning and protection to overcome indirect lightning and other electromagnetic threats possible in an aircraft.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft flight control surface position sensing system, comprising:
   a flight control computer; and
   a digital surface position sensor in operable communication with the flight control computer, the digital surface position sensor comprising:
      a position sensor adapted to be coupled to an aircraft flight control surface, the position sensor configured to sense a position of the aircraft flight control surface and supply a position signal representative thereof;
      an adaptable hardware input that provides an identification signal that identifies the aircraft flight control surface that the position sensor is coupled to;
      a processing circuit coupled to receive the position signal and the identification signal, the processing circuit configured, upon receipt thereof, to process the position signal and the identification signal and generate (i) a first digital position signal representative of the position of, and the identification of, the aircraft flight control surface and (ii) and independent second digital signal representative of the position of, and the identification of, the aircraft flight control surface.

2. The system of claim 1, wherein the flight control computer is configured, in response to an input command, to implement a pairing process in which the flight control computer:
   receives the first and second digital position signals from the digital surface position sensor when the aircraft flight control surface is in a stowed position;
   processes the first and second digital position signals to determine an offset position of the digital surface position sensor relative to the stowed position; and
   stores the offset position in non-volatile memory for use in computing actual aircraft flight control surface position.

3. The system of claim 2, wherein the flight control computer is configured to compute the actual aircraft flight control surface position by computing a difference between the offset position and the sensed position of the aircraft flight control surface position.

4. The system of claim 1, wherein the digital surface position sensor further comprises:
   a first digital protocol bus driver coupled to receive and convert the first digital position signal to a converted first digital position signal having a digital bus protocol; and
   a second digital protocol bus driver coupled to receive and convert the second digital position signal to a converted second digital position signal having the digital bus protocol.

5. The system of claim 4, wherein:
   the first and second digital bus drivers are each Controller Area Network (CAN) bus drivers; and
   the digital bus protocol is the CAN bus protocol.

6. The system of claim 5, wherein the digital surface position sensor further comprises:
   first signal conditioning circuitry coupled to receive and transmit the converted first digital position signal supplied from the first digital bus driver;
   second signal conditioning circuitry coupled to receive and transmit the converted second digital position signal supplied from the second digital bus driver.

7. The system of claim 1, wherein the position sensor comprised a Hall sensor.

8. The system of claim 1, wherein the digital surface position sensor is further configured, in response to an input command, to implement a pairing process in which the processing circuit:
   processes the first and second digital position signals to determine an offset position of the digital surface position sensor relative to the stowed position; and
   stores the offset position in non-volatile memory for use in computing actual aircraft flight control surface position.

9. The system of claim 8, wherein the processing circuit is further configured to compute the actual aircraft flight control surface position by computing a difference between the offset position and the sensed position of the aircraft flight control surface position.

10. A digital surface position sensor, the digital surface position sensor comprising:
    a position sensor adapted to be coupled to an aircraft flight control surface, the position sensor configured to sense a position of the aircraft flight control surface and supply a position signal representative thereof;
    an adaptable hardware input that provides an identification signal that identifies the aircraft flight control surface that the position sensor is coupled to;
    a processing circuit coupled to receive the position signal and the identification signal, the processing circuit configured, upon receipt thereof, to process the position signal and the identification signal and generate (i) a first digital position signal representative of the position of, and the identification of, the aircraft flight control surface and (ii) and independent second digital signal representative of the position of, and the identification of, the aircraft flight control surface.

11. The digital surface position sensor of claim 10, further comprising:
    a first digital protocol bus driver coupled to receive and convert the first digital position signal to a converted first digital position signal having a digital bus protocol; and
    a second digital protocol bus driver coupled to receive and convert the second digital position signal to a converted second digital position signal having the digital bus protocol.

12. The digital surface position sensor of claim 11, wherein:

the first and second digital bus drivers are each Controller Area Network (CAN) bus drivers; and the digital bus protocol is the CAN bus protocol.

13. The digital surface position sensor of claim 12, further comprising:

first signal conditioning circuitry coupled to receive and transmit the converted first digital position signal supplied from the first digital bus driver; and second signal conditioning circuitry coupled to receive and transmit the converted second digital position signal supplied from the second digital bus driver.

14. The digital surface position sensor of claim 10, wherein the position sensor comprises a Hall sensor.

15. The digital surface position sensor of claim 10, wherein the digital surface position sensor is further configured, in response to an input command, to implement a pairing process in which the processing circuit:

processes the first and second digital position signals to determine an offset position of the digital surface position sensor relative to a stowed position of the flight control surface; and stores the offset position in non-volatile memory for use in computing actual aircraft flight control surface position.

16. The system of claim 15, wherein the processing circuit is further configured to compute the actual aircraft flight control surface position by computing a difference between the offset position and the sensed position of the aircraft flight control surface position.

17. An aircraft fly-by-wire flight control system, comprising:

a flight control surface actuator controller coupled to receive flight control surface position command data that is indicative of a commanded position of a flight control surface, the flight control surface actuator controller configured, upon receipt of the flight control surface position command data, to generate and supply flight control surface actuator commands;

a flight control surface actuator coupled to receive the flight control surface actuator commands from the flight control surface actuator controller and configured, upon receipt thereof, to move the flight control surface to the commanded position;

a flight control inceptor configured to receive user input from a user and configured, in response to the user input, to supply inceptor command data;

a flight control computer in operable communication with the flight control inceptor and the flight control surface actuator controller, the flight control computer coupled to receive the inceptor command data from the flight control inceptor and configured, upon receipt of the inceptor data, to generate and supply the flight control surface position command data to the flight control surface actuator controller; and a digital surface position sensor in operable communication with the flight control computer, the digital surface position sensor comprising:

a position sensor adapted to be coupled to an aircraft flight control surface, the position sensor configured to sense a position of the aircraft flight control surface and supply a position signal representative thereof;

an adaptable hardware input that provides an identification signal that identifies the aircraft flight control surface that the position sensor is coupled to;

a processing circuit coupled to receive the position signal and the identification signal, the processing circuit configured, upon receipt thereof, to process the position signal and the identification signal and generate (i) a first digital position signal representative of the position of, and the identification of, the aircraft flight control surface and (ii) and independent second digital signal representative of the position of, and the identification of, the aircraft flight control surface.

18. The system of claim 17, wherein the flight control computer is configured, in response to an input command, to implement a pairing process in which the flight control computer:

receives the first and second digital position signals from the digital surface position sensor when the aircraft flight control surface is in a stowed position;

processes the first and second digital position signals to determine an offset position of the digital surface position sensor relative to the stowed position; and stores the offset position in non-volatile memory for use in computing actual aircraft flight control surface position, wherein the flight control computer is further configured to compute the actual aircraft flight control surface position by computing a difference between the offset position and the sensed position of the aircraft flight control surface position.

19. The system of claim 17, wherein the digital surface position sensor is further configured, in response to an input command, to implement a pairing process in which the processing circuit:

processes the first and second digital position signals to determine an offset position of the digital surface position sensor relative to the stowed position; and stores the offset position in non-volatile memory for use in computing actual aircraft flight control surface position, and wherein the processing circuit is further configured to compute the actual aircraft flight control surface position by computing a difference between the offset position and the sensed position of the aircraft flight control surface position.

20. The system of claim 17, wherein the digital surface position sensor further comprises:

a first digital protocol bus driver coupled to receive and convert the first digital position signal to a converted first digital position signal having a digital bus protocol;

a second digital protocol bus driver coupled to receive and convert the second digital position signal to a converted second digital position signal having the digital bus protocol;

first signal conditioning circuitry coupled to receive and transmit the converted first digital position signal supplied from the first digital bus driver; and second signal conditioning circuitry coupled to receive and transmit the converted second digital position signal supplied from the second digital bus driver.

* * * * *